US012732951B2

(12) United States Patent
Nakayama et al.

(10) Patent No.: US 12,732,951 B2
(45) Date of Patent: Sep. 8, 2026

(54) COMMUNICATION SYSTEM, CONTROL SERVER APPARATUS, CONTROL METHOD AND PROGRAM

(71) Applicant: NTT, Inc., Tokyo (JP)

(72) Inventors: Shota Nakayama, Tokyo (JP); Daisuke Murayama, Tokyo (JP); Toshiro Nakahira, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 314 days.

(21) Appl. No.: 18/571,902

(22) PCT Filed: Jul. 26, 2021

(86) PCT No.: PCT/JP2021/027578

§ 371 (c)(1),
(2) Date: Dec. 19, 2023

(87) PCT Pub. No.: WO2023/007554

PCT Pub. Date: Feb. 2, 2023

(65) Prior Publication Data

US 2024/0365279 A1 Oct. 31, 2024

(51) Int. Cl.
*H04W 64/00* (2009.01)

(52) U.S. Cl.
CPC ....... *H04W 64/003* (2013.01); *H04W 64/006* (2013.01)

(58) Field of Classification Search
CPC .. H04W 64/003; H04W 64/006; H04W 16/24
(Continued)

(56) References Cited

U.S. PATENT DOCUMENTS 8,954,083 B1 * 2/2015 Yenney ................. H04W 16/18 455/421
2011/0092237 A1 * 4/2011 Kato .................. H04B 7/15528 455/507

(Continued)

FOREIGN PATENT DOCUMENTS

JP 2018-195928 12/2018

OTHER PUBLICATIONS

Machine English Translation of JP2018-195928A. pp. 1-15. 2025 (Year: 2025).*

(Continued)

*Primary Examiner* — Don N Vo
(74) *Attorney, Agent, or Firm* — IPUSA, PLLC

(57) ABSTRACT

A communication system including a control server apparatus and a movable base station device, wherein the control server apparatus is configured to select, as a movement destination position of the movable base station device, a position at which a movement distance from a current position of the movable base station device is minimum, among positions at which a base station position evaluation index is equal to or larger than a threshold, or a position at which the base station position evaluation index is maximum, among positions at which the movement distance from the current position of the movable base station device is equal to or smaller than a threshold, and wherein the control server apparatus is configured to perform control to move the movable base station device to the movement destination position.

7 Claims, 11 Drawing Sheets

(58) Field of Classification Search
USPC ........................................................ 455/456.5
See application file for complete search history.

(56) References Cited

U.S. PATENT DOCUMENTS

| | | | | |
|---|---|---|---|---|
| 2012/0172045 | A1* | 7/2012 | Fukuta ................ | H04W 36/326 455/440 |
| 2021/0099933 | A1* | 4/2021 | Matsuda ......... | H04W 36/00725 |
| 2022/0141064 | A1* | 5/2022 | Horn ..................... | H04W 72/23 370/329 |

OTHER PUBLICATIONS

Yoshihisa Kishiyama et al., "5G outdoor experiment of ultra-high speed and long distance transmission using millimeter waves", Docomo technical journal (vol. 26-1, p. 25-32), Apr. 2018.

* cited by examiner (a)
BASE STATION 1 A
BASE STATION 1 B
BASE STATION 1 C
BASE STATION 2
(b)
BASE STATION 1 A
BASE STATION 1 D
BASE STATION 1 C
BASE STATION 2
BASE STATION
TERMINAL
SHIELDING OBJECT SUCH AS PILLAR OF BUILDING, SHELF, OR ARTICLE (a)
(b)
MOVEMENT DISTANCE
CURRENT POSITION OF MOVABLE BASE STATION
CANDIDATE MOVEMENT DESTINATION POSITION
ARRANGEABLE POSITION OF MOVABLE BASE STATION B
1007
INPUT DEVICE
1008
OUTPUT DEVICE
1006
DISPLAY DEVICE
1003
MEMORY DEVICE
1005
INTERFACE DEVICE
1002
AUXILIARY STORAGE DEVICE
1004
CPU
1000
DRIVE DEVICE
1001
RECORDING MEDIUM

COMMUNICATION SYSTEM, CONTROL SERVER APPARATUS, CONTROL METHOD AND PROGRAM

TECHNICAL FIELD

The present invention relates to a control method for a base station in a wireless communication system.

BACKGROUND ART

Introduction of 5G, which achieves a large-capacity system, a high-velocity data transmission rate, a low delay, simultaneous connection of a large number of terminals, and the like, is in progress. In 5G, a high-frequency band such as a millimeter wave band is used in addition to a frequency band used in current mobile communication (Non-Patent Literature 1).

CITATION LIST

Non-Patent Literature

Non-Patent Literature 1: Miriha wo mochiita chou-kousoku choukyori densou no 5G okugai jikken (5G outdoor experiment of ultra-high speed and long distance transmission using millimeter waves), Kishiyama, Okumura, and others, Docomo technical journal (Vol. 26-1, P 25-32)

SUMMARY OF INVENTION

Technical Problem

In a distribution center, an exhibition hall (event venue), or the like, there is a use case of providing a wireless communication service by a wireless system (wireless LAN, local 5G, or the like) that uses a high-frequency band. However, the quality of communication is not stable in a distribution center, an exhibition hall, or the like in which many shielding objects are present and move. In addition, radio waves in a high-frequency band such as 5G have high straightness, and have a large loss due to shielding.

Therefore, a technique of controlling a movable base station in real time in consideration of the positions of a terminal and a shielding object has been proposed. However, in the technique of controlling a movable base station in real time, the position of the movable base station may greatly change in each control, depending on the control method and the environment, and there is a possibility that a period in which the base station arrangement does not provide optimal quality may occur and the quality may deteriorate during the period.

The present invention has been made in view of the above points, and an object of the present invention is to provide a technique that makes it possible to reduce the moving time of a movable base station in a technique of controlling the movable base station in real time.

Solution to Problem

According to the disclosed technique, there is provided a communication system including a control server apparatus and a movable base station device, wherein the control server apparatus is configured to select, as a movement destination position of the movable base station device, a position at which a movement distance from a current position of the movable base station device is minimum, among positions at which a base station position evaluation index is equal to or larger than a threshold, or a position at which the base station position evaluation index is maximum, among positions at which the movement distance from the current position of the movable base station device is equal to or smaller than a threshold, and wherein the control server apparatus is configured to perform control to move the movable base station device to the movement destination position.

Advantageous Effects of Invention

According to the disclosed technique, the moving time of a movable base station can be reduced, and the occurrence of a period in which the communication quality deteriorates can be suppressed.

DESCRIPTION OF EMBODIMENTS

Hereinafter, an embodiment of the present invention (hereinafter "present embodiment") will be described with reference to the drawings. The embodiment described below is merely an example, and embodiments to which the present invention is applied are not limited to the following embodiment.

For example, in a case where a two-dimensional position is used as an example of the position of a terminal or a base station in the description of the following embodiment, a three-dimensional position may be used as the position of the terminal or the base station. In addition, each of a base station, a movable base station, a terminal, and a control server in the present specification is a device, and thus they may be referred to as a base station device, a movable base station device, a terminal device, and a control server apparatus.

Outline of Embodiment

As described above, in real-time movable base station control in which the positions and the like of a terminal and a shielding object are taken into consideration, there is a case where the arrangement position of a movable base station may change greatly in each control depending on the control method and the environment, and there is a possibility that a period in which the base station arrangement does not provide the optimal quality may occur and the quality may deteriorate during the period.

Figure 1:
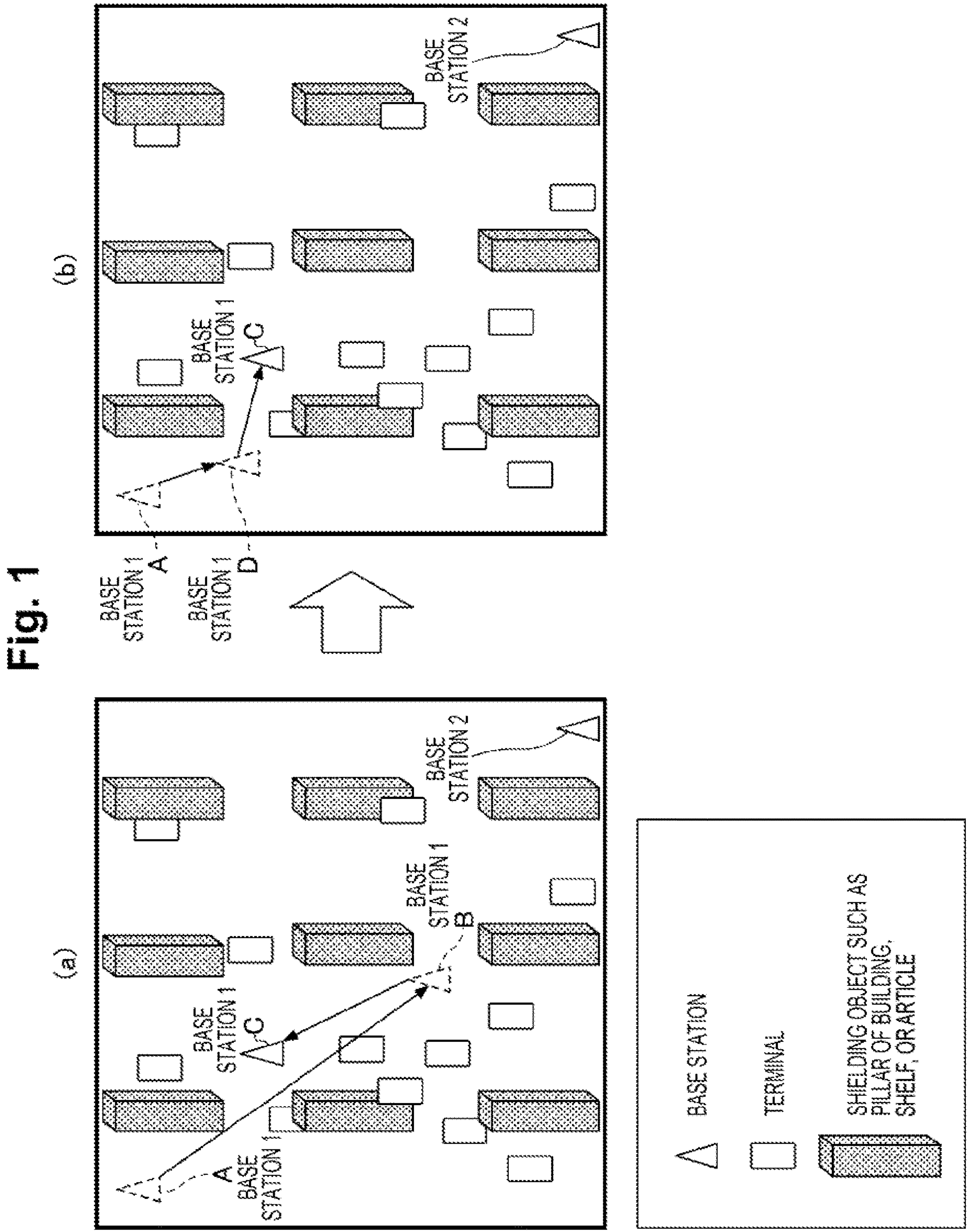
FIG. 1 is a top view of an area where shielding objects such as a shelf and an article are placed.

An example of a situation in which an event as described above occurs will be described with reference to FIG. 1. FIG. 1 illustrates a situation in which there are a base station 1, a base station 2, and a plurality of terminals in a building. In addition, in the building, there are shielding objects such as pillars of the building, shelves, and articles.

In the control example in FIG. 1(*a*), the base station 1 moves from the position indicated by A to the position indicated by B, and then moves to the position indicated by C. Meanwhile, in the control example illustrated in FIG. 1(*b*), the base station 1 moves to the position indicated by D near A, and then moves to the position indicated by C.

As in the case of FIG. 1(*a*), when the distance that the base station 1 moves increases, there is a possibility that the time required for the movement may increase, a period in which the quality is not optimal may occur, and the quality may deteriorate during the period. In the present embodiment, as illustrated in FIG. 1(*b*), the distance that the base station 1 moves can be shortened to reduce the moving time.

In the present embodiment, a control server 100 to be described later selects a movement destination in consideration of the moving distance of a movable base station in order to reduce the moving time of the movable base station while maintaining required communication quality. Although details of the present embodiment will be described in Example 1 to 3 to be described later, an outline of the present embodiment is as follows.

In Example 1, a threshold is set to a base station position evaluation index, so that the movement range of the movable base station is controlled within a range satisfying the required communication quality. In Example 2, a movable range of the movable base station is set, and the place having the highest base station position evaluation index in the range is selected as the movement destination of the movable base station.

In Example 3, control is performed to arrange the movable base station at the center of gravity of a terminal cluster, and, at this time, the center of gravity is determined by excluding outliers (outlier terminals).

The above technique makes it possible to control the communication quality and the movement range of the movable base station. More specifically, the moving time of the movable base station can be reduced, and the occurrence of a period in which the communication quality deteriorates can be suppressed. Furthermore, in a case where there is an unevenness in the distribution of the positions and velocities (accelerations) of terminals, excluding that unevenness makes it possible to suppress the movement range of the movable base station.

Overall Configuration

Figure 2:
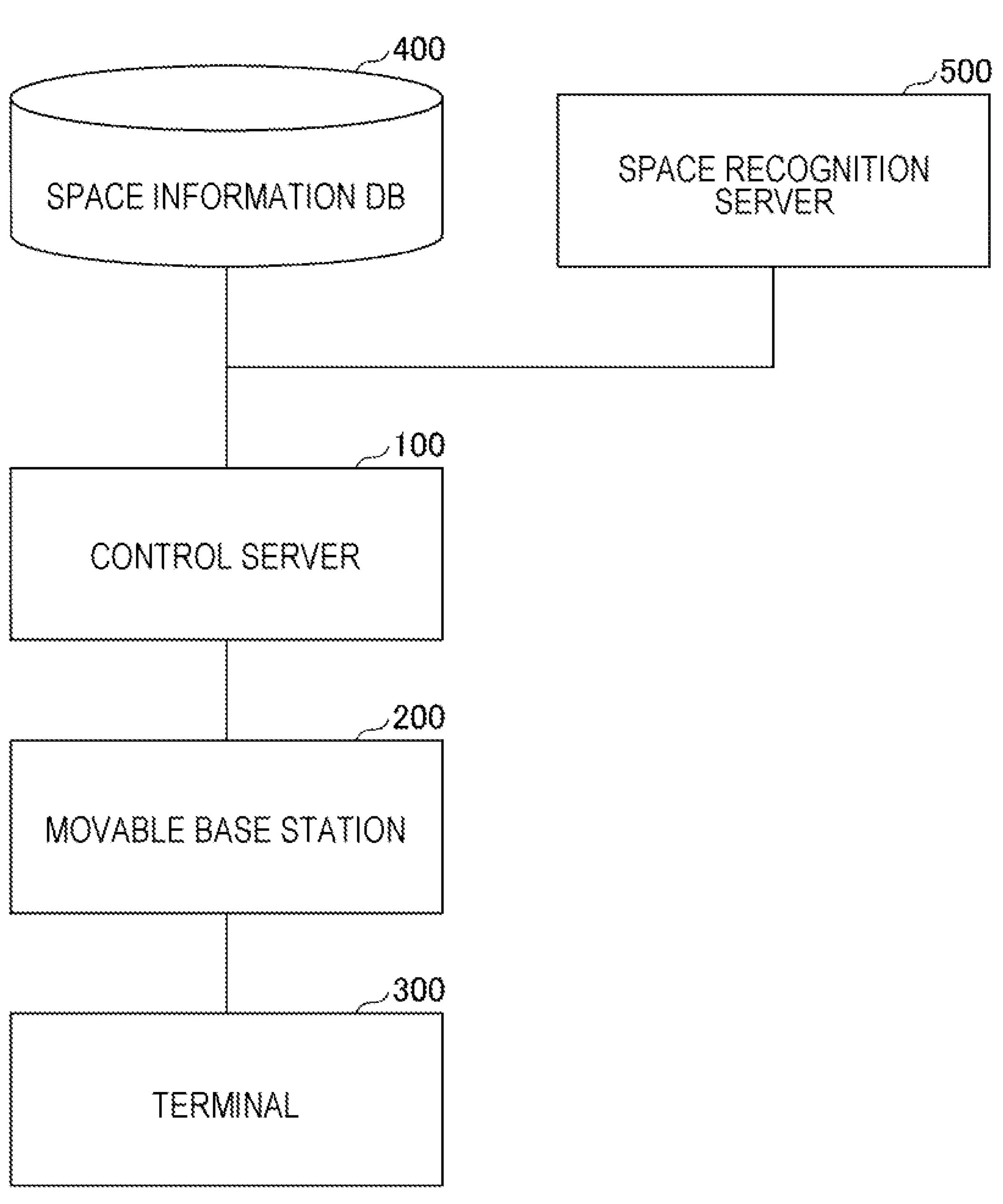
FIG. 2 is a diagram illustrating an overall configuration example of a wireless communication system according to an embodiment of the present invention.

FIG. 2 illustrates an overall configuration example of a wireless communication system in the present embodiment. As illustrated in FIG. 2, the wireless communication system according to the present embodiment includes the control server 100, a movable base station 200, a terminal 300, a space information database (DB) 400, and a space recognition server 500. Although only one movable base station 200 and one terminal 300 are illustrated, there may be a plurality of movable base stations and terminals.

The control server 100 may be arranged on a cloud, or may be arranged on a network (wireless LAN, wired LAN, or the like) together with the movable base station 200. Similarly, the space information DB 400 and the space recognition server 500 may be arranged on a cloud or may be arranged on the network.

The space information DB 400 stores information such as position information of each terminal and the position and material of each shielding object calculated by the space recognition server 500. The space recognition server 500 calculates the position information of each terminal, the position information of each shielding object, and the like from camera video information, LiDAR information, or the like, and stores the calculated information in the space information DB 400.

More specifically, the space information DB 400 stores, for each shielding object, the shape (including a thickness or the like), the position in an area, the material, the attenuation amount per unit thickness, and the like, for example. Note that the attenuation amount per unit thickness may be calculated from the material in the control server 100. Furthermore, the space information DB 400 stores, for each terminal, the current position, a base station as a connection destination, and the like, for example.

The control server 100 acquires information from the space information DB 400 and controls the movable base station 200 on the basis of the acquired information.

The movable base station 200 is arranged at a position at which communication with the control server 100 is possible, and houses the terminal 300. The terminal 300 is connected to the movable base station 200 and is connected to a local network or the Internet via the movable base station 200.

Configuration of Control Server 100

Figure 3:
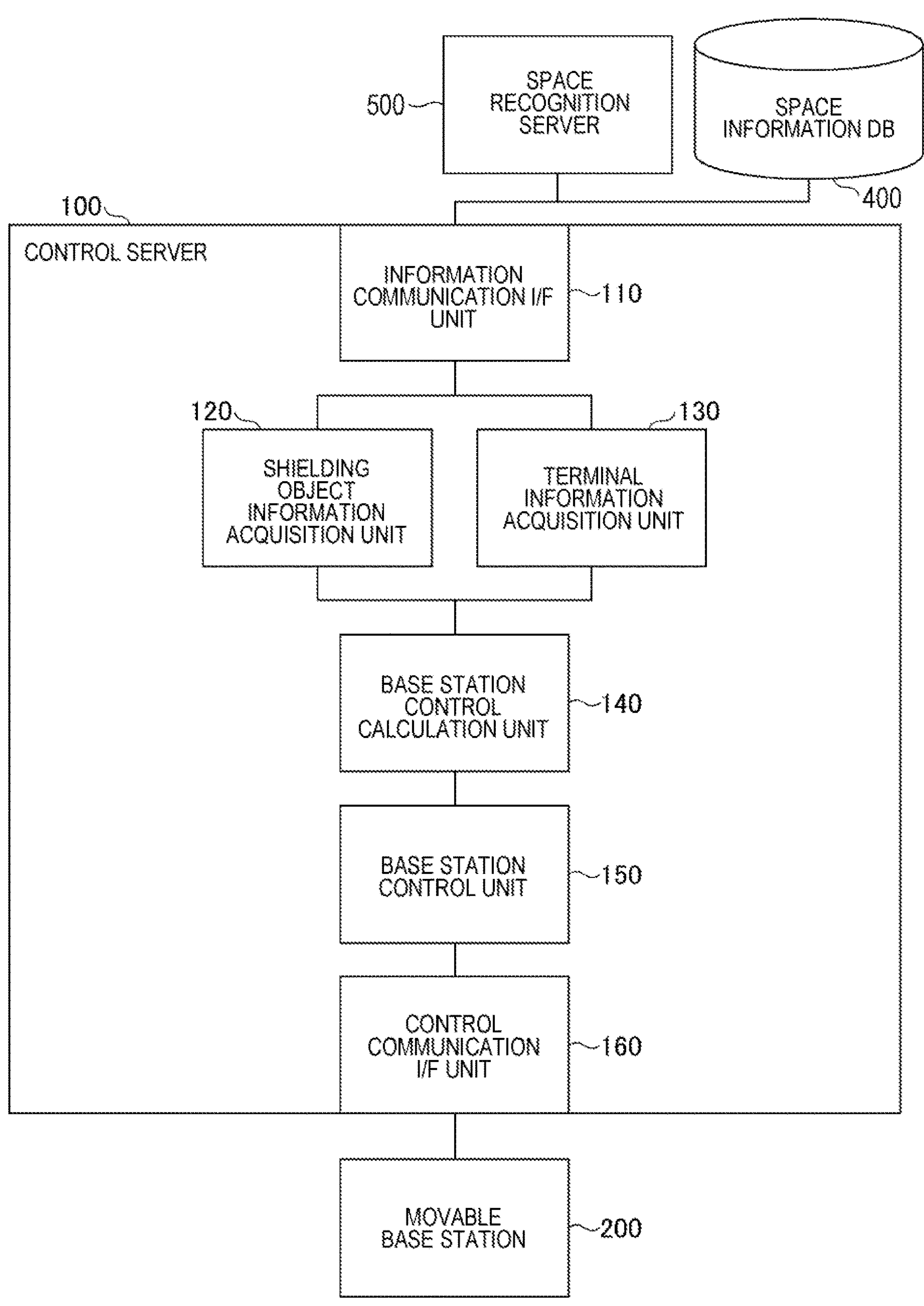
FIG. 3 is a configuration diagram of a control server.

FIG. 3 illustrates a configuration example of the control server 100. As illustrated in FIG. 3, the control server 100 includes an information communication I/F unit 110, a shielding object information acquisition unit 120, a terminal information acquisition unit 130, a base station control calculation unit 140, a base station control unit 150, and a control communication I/F unit 160.

The information communication I/F unit 110 is connected to the space information DB 400 and transmits and receives information about shielding objects and terminal information.

The shielding object information acquisition unit 120 acquires information such as the shape, position, and material of a shielding object from the space information DB 400. The terminal information acquisition unit 130 acquires position information and the like of the terminal 300 from the space information DB 400.

The base station control calculation unit 140 acquires the information about the shielding object and the terminal 300 from the shielding object information acquisition unit 120 and the terminal information acquisition unit 130, respectively, and calculates the installation position of the movable base station 200 and the connection destination of the terminal 300.

The base station control unit 150 controls the movable base station 200 on the basis of the results calculated by the base station control calculation unit 140. The control communication I/F unit 160 is connected to the movable base station 200 and transmits and receives control communication. Note that, regarding the control of the connection destination of the terminal 300, the base station control unit 150 may instruct the movable base station 200 to control the connection destination of the terminal 300, or may indicate the connection destination to the terminal 300.

(Configuration Example of Movable Base Station 200)

Figure 4:
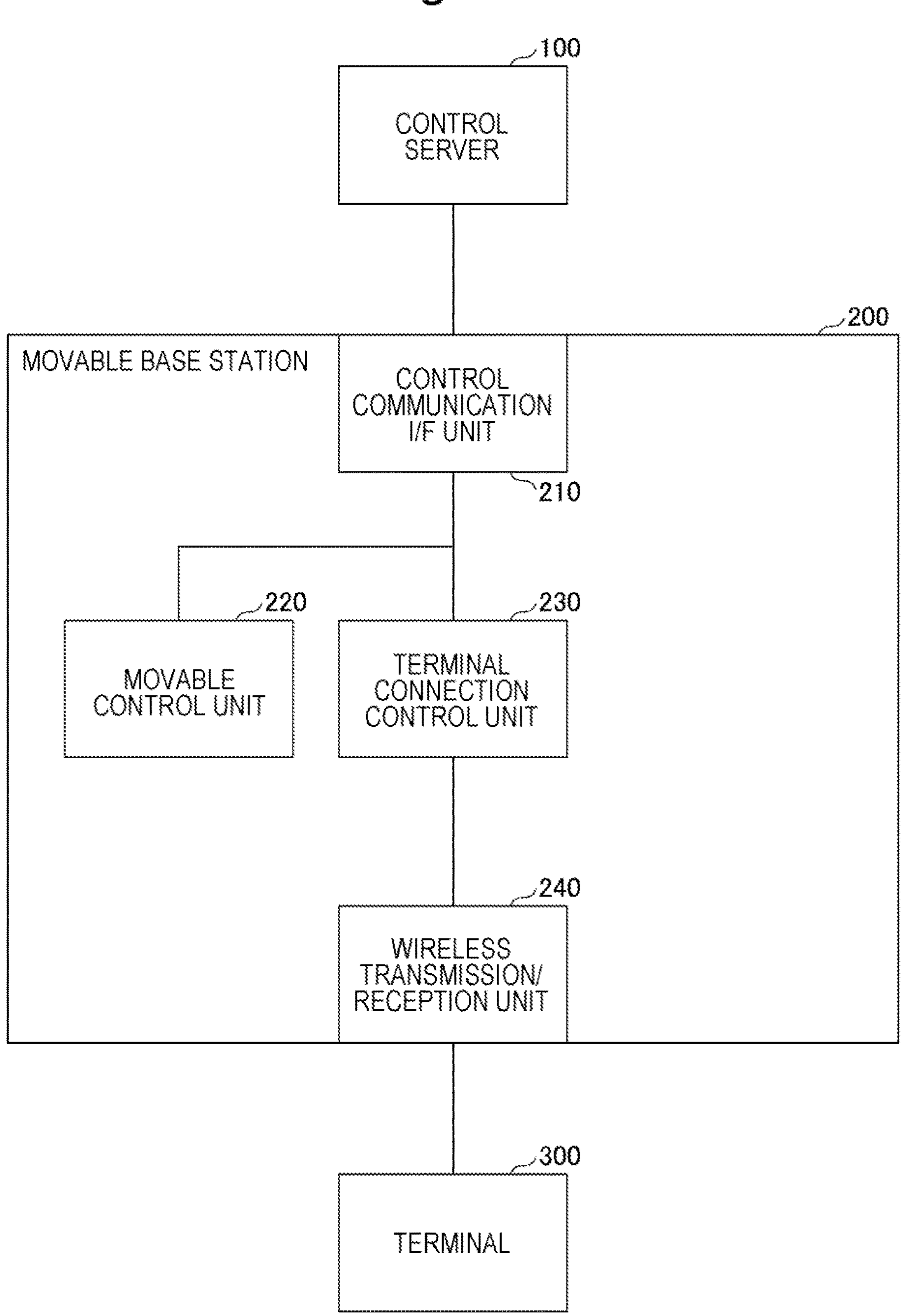
FIG. 4 is a configuration diagram of a movable base station.

FIG. 4 illustrates a configuration example of the movable base station 200. As illustrated in FIG. 4, the movable base station 200 includes a control communication I/F unit 210, a movable control unit 220, a terminal connection control unit 230, and a wireless transmission/reception unit 240. Note that FIG. 4 particularly illustrates functions related to position control and terminal control in the movable base station 200.

The control communication I/F unit 210 is connected to the control server 100 and transmits and receives control information. The movable control unit 220 receives control information from the control server 100 and controls the position of the movable base station 200.

The terminal connection control unit 230 receives control information from the control server 100 and controls connection of the terminal 300. In addition, the terminal connection control unit 230 changes the connection destination of the target terminal 300. The wireless transmission/reception unit 240 is connected to the terminal 300, and transmits and receives a connection destination control signal to and from the terminal 300.

Note that, in a case where the movable base station 200 is mounted on, for example, a drone, the movable control unit 220 receives information about a position where the movable base station 200 is to be arranged, from the control server 100, and instructs the drone to move to the position.

Figure 5:
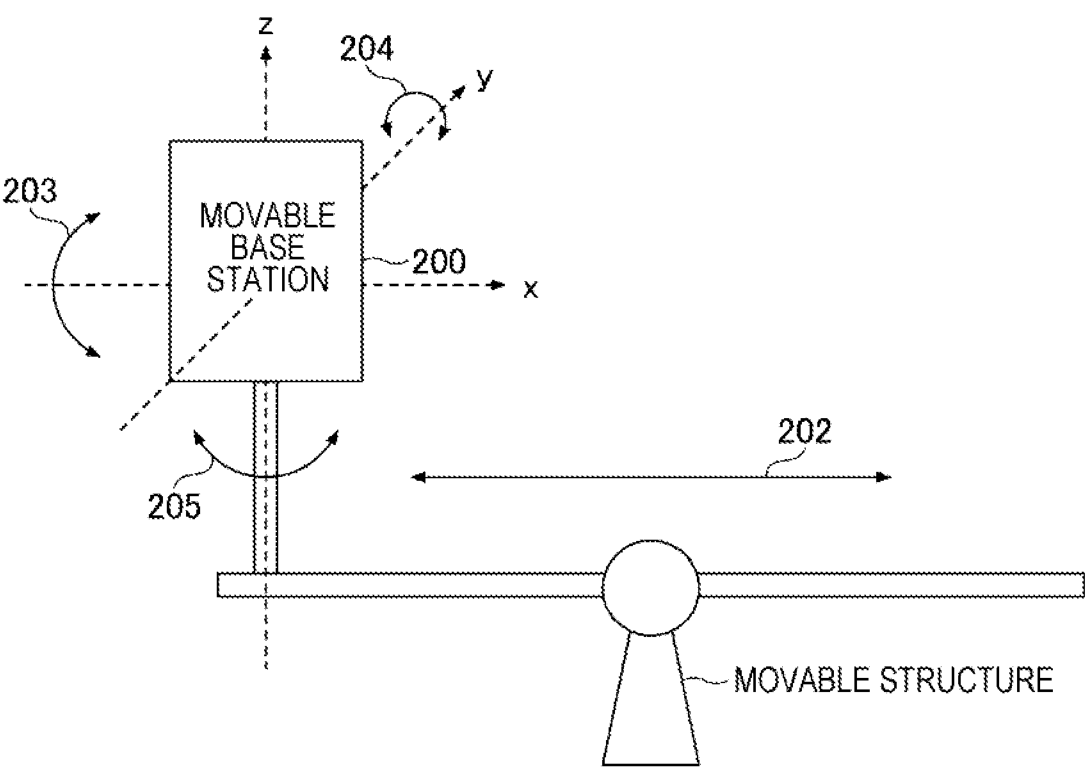
FIG. 5 is a diagram illustrating an example of a case where the movable base station is mounted on a movable structure.

Furthermore, as illustrated in FIG. 5, the movable base station 200 may include a movable structure that supports the movable base station 200. The movable structure moves the movable base station 200 in the direction of an arrow 201 on the basis of, for example, position information transmitted from the control server 100. Furthermore, the movable structure may rotationally move the movable base station 200 around the x-axis (see reference numeral 203), the y-axis (see reference numeral 204), and the z-axis (see reference numeral 205) on the basis of, for example, control information transmitted from the control server 100.

In addition, the movable structure on which the movable base station 200 is mounted may be manually moved, and fine position control may be performed by the control server 100.

Hereinafter, Examples 1 to 3 will be described as examples of the control operation by the control server 100. Note that, for convenience of description, the control operation for one movable base station 200 will be described in Examples 1 and 2.

Example 1

In Example 1, the control server 100 sets a threshold to the base station position evaluation index, thereby controlling the movement range of the movable base station 200 within a range in which the base station position evaluation index satisfies the threshold.

Figure 6:
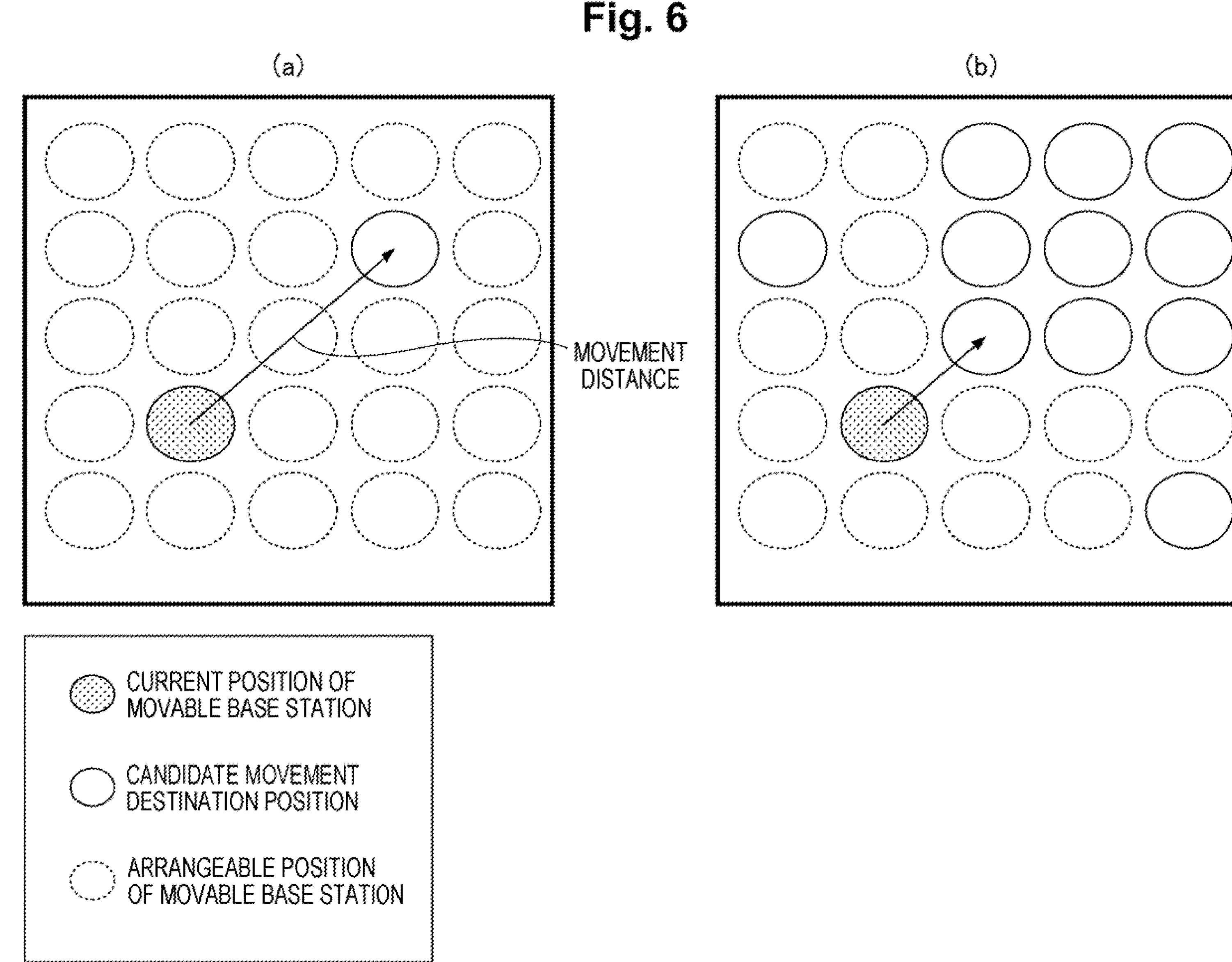
FIG. 6 is a diagram for describing an outline of Example 1.

An outline of Example 1 will be described with reference to FIG. 6. In FIG. 6(*a*) and FIG. 6(*b*), a shaded circle indicates the current position of the movable base station 200, a solid circle indicates a candidate movement destination position of the movable base station, and a dotted circle indicates an arrangeable position of the movable base station.

For comparison with FIG. 6(*b*), FIG. 6(*a*) illustrates the current position of the movable base station and the position of a movement destination in a case where no threshold is set to the base station position evaluation index. In a case where no threshold is set to the base station position evaluation index, the movement destination position that is assumed to have the best base station position evaluation index and the best communication quality is selected. Therefore, the moving distance of the movable base station 200 is longer than that in the case of FIG. 6(*b*).

FIG. 6(*b*) illustrates the current position of the movable base station and candidate movement destination positions in a case where a threshold is set to the base station position evaluation index. As illustrated in FIG. 6(*b*), in a case where a threshold is set to the base station position evaluation index, a plurality of candidate movement destination positions satisfying the required communication quality is selected.

Increasing the number of candidate positions to which the movable base station can move makes it possible to select a candidate movement destination position based on various criteria. For example, the movement destination having the shortest movement distance can be selected. In addition, a place to which the movable base station moves easily (because, for example, there is no obstacle on the route) can be selected as a movement destination.

Figure 7:
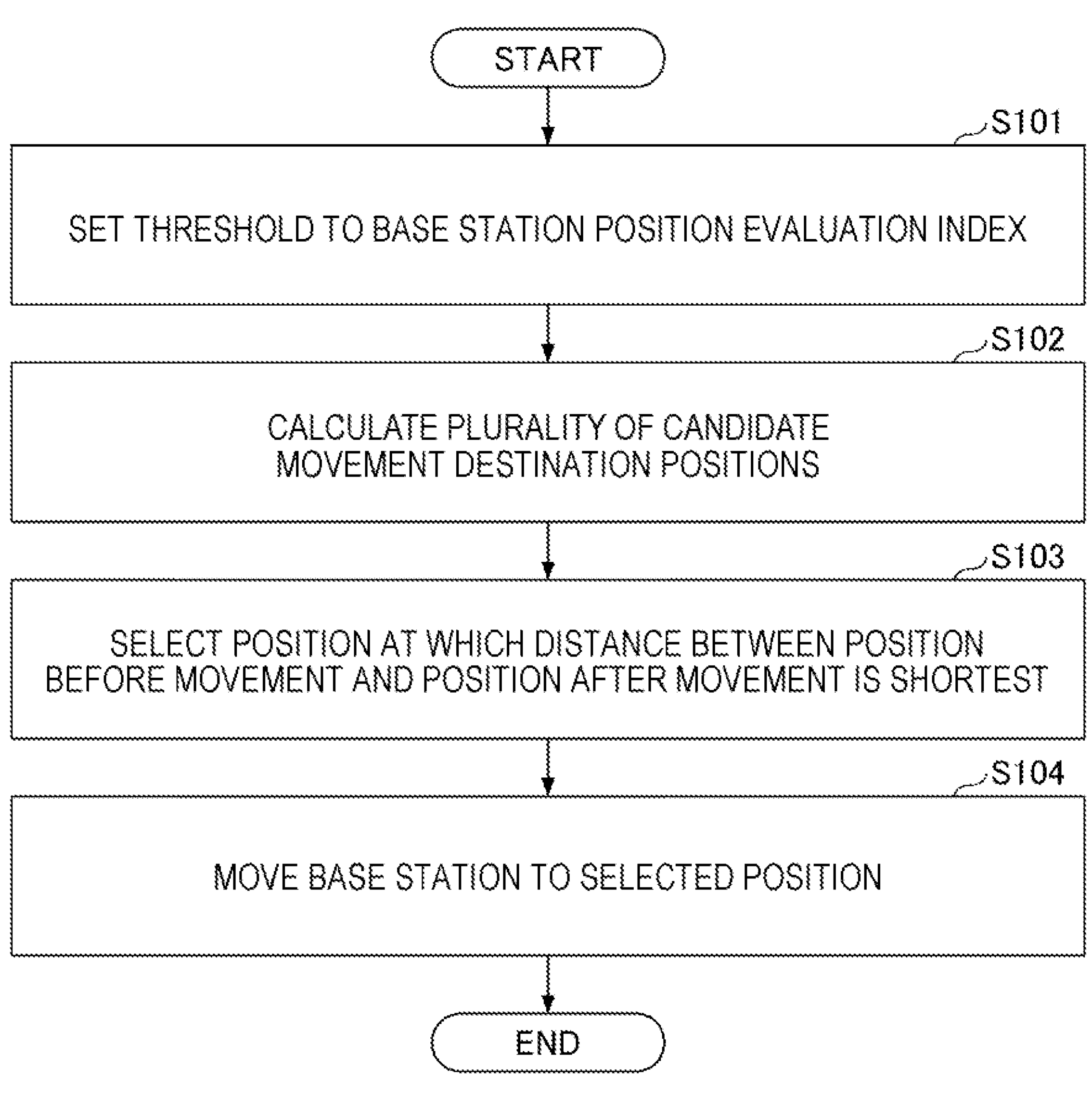
FIG. 7 is a flowchart illustrating an operation example of Example 1.
Figure 8:
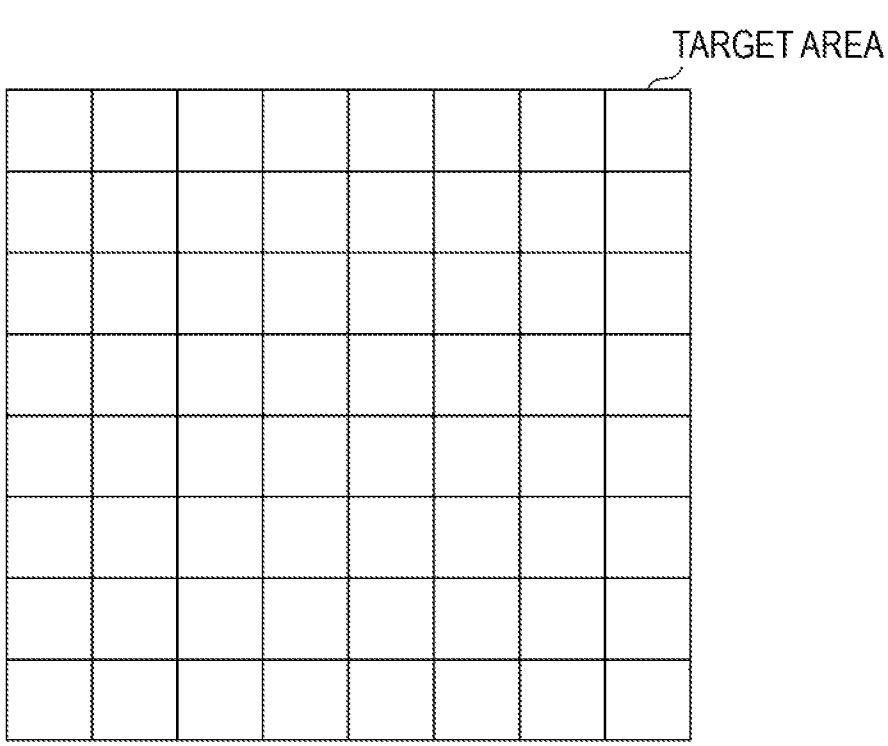
FIG. 8 is a diagram for describing area elements in a target area.

Hereinafter, an operation example of the control server 100 according to Example 1 will be described following the procedure of the flowchart of FIG. 7. In the following control example, there is an area to be controlled, and the area is referred to as a control area. As illustrated in FIG. 1, there are movable base stations 200, terminals 300, and shielding objects in the control area. In addition, as illustrated in FIG. 8, the control area is divided into predetermined areas, and the divided areas are referred to as "area elements" or "elements". The same applies to the other examples.

S101

In S101, a threshold of the base station position evaluation index is set in the control server 100. The set threshold is stored in a storage means such as a memory of the control server 100 and is referenced by the base station control calculation unit 140.

Base Station Position Evaluation Index

The base station position evaluation index is an index used at the time of calculating a candidate movement destination position of each of the movable base stations 200, and examples of the base station position evaluation index will be described below together with acquisition methods thereof.

Example 1 of Base Station Position Evaluation Index: Number of Line-Of-Sight Terminals The number of line-of-sight terminals is the number of terminals that can be seen from the movable base station 200 without being shielded by a shielding object. A method for acquiring the number of line-of-sight terminals is as follows.

First, the shielding object information acquisition unit 120 acquires position information of each shielding object from the space information DB 400, and the terminal information acquisition unit 130 acquires position information of each of the terminals 300.

Next, the base station control calculation unit 140 determines whether each terminal can be seen from the movable base station 200, by using the position information of each shielding object and the position information of each terminal, and calculates the number of terminals within the line of sight. Whether each terminal can be seen can be determined, for example, on the basis of whether a straight line can be drawn from an antenna of the movable base station 200 to the terminal 300 without collision with a shielding object.

Example 2 of Base Station Position Evaluation Index: Number of Area Elements within Line of Sight The number of area elements within the line of sight is the number of area elements that can be seen from the movable base station 200 without being shielded by a shielding object.

The base station control calculation unit 140 determines whether each area element can be seen from the movable base station 200, by using the position information of each shielding object and position information of each area element, and calculates the number of area elements within the line of sight.

Example 3 of Base Station Position Evaluation Index: Communication Quality of Area Elements The communication quality of area elements is communication quality such as throughput in each area element.

The base station control calculation unit 140 obtains, for each area element in the area, the propagation loss from the antenna of the movable base station 200 to the area element by ray tracing simulation or the like, calculates estimated reception power from the transmission output—the propagation loss, and estimates the communication quality from the estimated reception power. The base station control calculation unit 140 uses, for example, a sum or an average value of communication quality in all area elements as the base station position evaluation index.

Example 4 of Base Station Position Evaluation Index: Communication Quality of Terminals The communication quality of the terminals is communication quality such as throughput in each terminal. The base station control calculation unit 140 obtains, for each terminal, the propagation loss from the antenna of the movable base station 200 to the terminal by ray tracing simulation or the like, calculates estimated reception power from the transmission output—the propagation loss, and estimates the communication quality from the estimated reception power. The base station control calculation unit 140 uses, for example, an average value of communication quality in all terminals as the base station position evaluation index.

S102

In S102, the base station control calculation unit 140 calculates the base station position evaluation index for each position at which the movable base station 200 can be arranged (for example, for each area element in which the movable base station 200 can be arranged), and calculates an arrangeable position at which the base station position evaluation index is equal to or greater than the threshold as a candidate movement destination position. In S102, a plurality of candidate movement destination positions is calculated.

For example, when the base station position evaluation index is the number of line-of-sight terminals and the threshold is TH1, the base station control calculation unit 140 calculates an arrangeable position that satisfies "base station position evaluation index TH1" as a candidate movement destination position.

For example, when the base station position evaluation index is the number of line-of-sight area elements and the threshold is TH2, the base station control calculation unit 140 calculates an arrangeable position that satisfies "base station position evaluation index≥TH2" as a candidate movement destination position.

For example, when the base station position evaluation index is the communication quality of the area elements and the threshold is TH3, the base station control calculation unit 140 calculates an arrangeable position that satisfies "base station position evaluation index TH3" as a candidate movement destination position.

For example, when the base station position evaluation index is the communication quality of the terminals and the threshold is TH4, the base station control calculation unit 140 calculates an arrangeable position that satisfies "base station position evaluation index≥TH4" as a candidate movement destination position.

S103

In S103, the base station control calculation unit 140 selects, as a movement destination position of the movable base station 200, a position after movement of the movable base station 200 at which the distance between the position before movement and the position after movement is the shortest. Specifically, the distance between a position before movement of the movable base station 200 and a position after the movement is set as a base station position evaluation index, and a position after movement at which the base station position evaluation index is minimized is selected as a movement destination position of the movable base station 200.

S104

In S104, the base station control unit 150 moves the movable base station 200 to the position selected in S103. Specifically, for example, the base station control unit 150 transmits, to the movable base station 200, information about the position at which the movable base station 200 is to be arranged and a command for instructing the movable base station 200 to move to the position. The base station control unit 150 may further transmit, to the movable base station 200, identification information of each terminal to be connected to the movable base station 200, and may instruct the movable base station 200 to transmit, to each terminal, a control signal for connection with the movable base station 200.

The control described above makes it possible to control the movement range of the movable base station within a range satisfying the required quality.

Example 2

Next, Example 2 will be described. In Example 2, a movable range is set, and a place having the highest base station position evaluation index within the range is selected. Note that examples of the base station position evaluation index are as described in Example 1.

Figure 9:
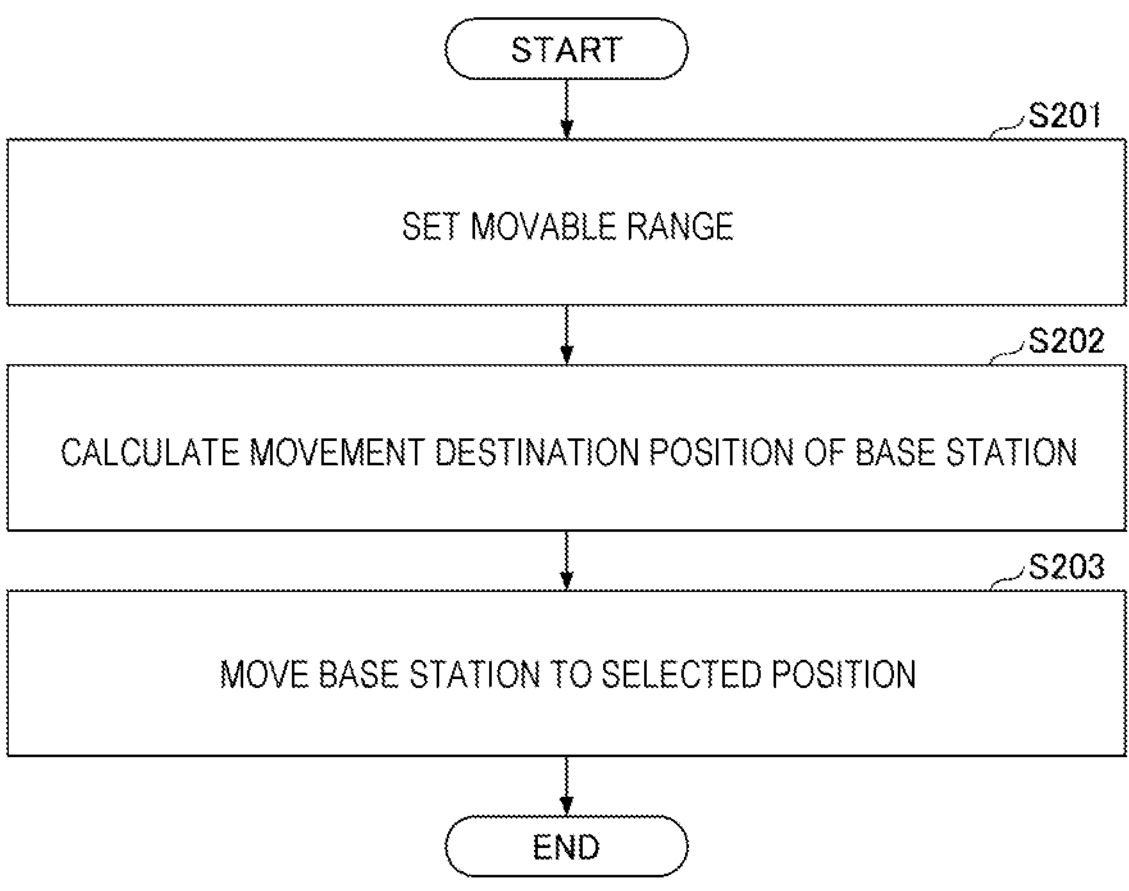
FIG. 9 is a flowchart illustrating an operation example of Example 2.

Hereinafter, an operation example of the control server 100 according to Example 2 will be described following the procedure of the flowchart of FIG. 9.

S201

In S201, a movable range of the movable base station 200 is set in the control server 100. As an example, when the position of the movable base station 200 before movement is (m, n), the movable range is set as a range within a circle having a radius d centered on (m, n). Information about the set movable range is stored in a storage means such as a memory of the control server 100 and is referenced by the base station control calculation unit 140.

S202

In S202, the base station control calculation unit 140 calculates the base station position evaluation index for each position at which the movable base station 200 can be arranged (for example, for each area element in which the movable base station 200 can be arranged), and calculates the arrangeable position having the highest base station position evaluation index within the movable range as a movement destination position.

S203

In S203, the base station control unit 150 moves the movable base station 200 to the position selected in S202. Specifically, for example, the base station control unit 150 transmits, to the movable base station 200, information about the position at which the movable base station 200 is to be arranged and a command for instructing the movable base station 200 to move to the position. The base station control unit 150 may further transmit, to the movable base station 200, identification information of each terminal to be connected to the movable base station 200, and may instruct the movable base station 200 to transmit, to each terminal, a control signal for connection with the movable base station 200.

Setting the movement range of the movable base station as described above makes it possible to maximize the communication quality within the range.

Example 3

Next, Example 3 will be described. In Example 3, in a method of arranging each of the movable base stations 200 at the center of gravity of a terminal cluster, outliers (outlier terminals) are excluded when the center of gravity is calculated.

Figure 10:
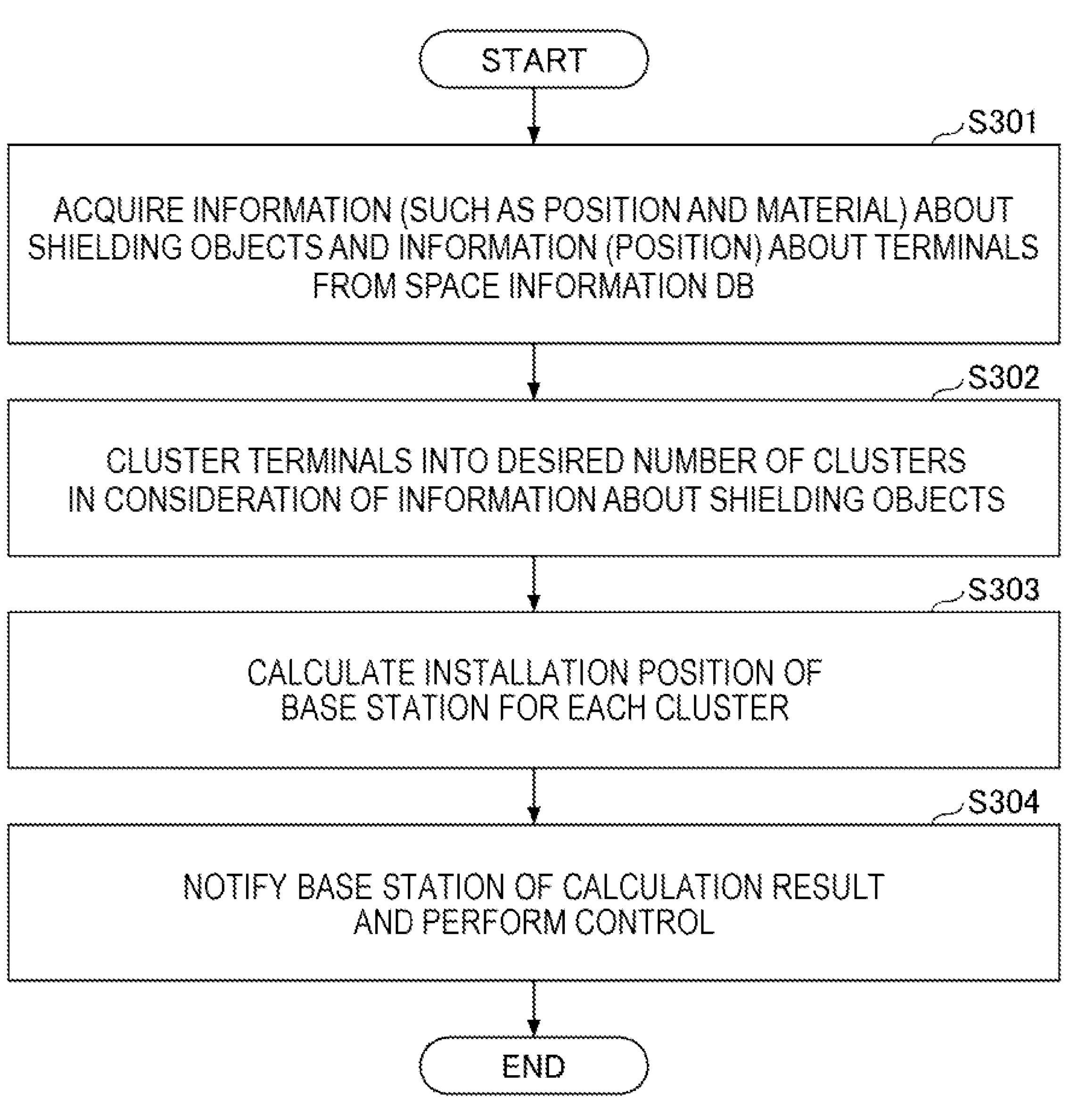
FIG. 10 is a flowchart illustrating an operation example of Example 3.

Hereinafter, an operation example of the control server 100 according to Example 3 will be described following the procedure of the flowchart of FIG. 10.

S301

In S301, the shielding object information acquisition unit 120 acquires information about shielding objects (position, material, and the like) from the space information DB 400, and the terminal information acquisition unit 130 acquires information about the terminals 300 (position of each terminal) from the space information DB 400.

S302

In S302, the base station control calculation unit 140 clusters the terminals 300 into a desired number of clusters in consideration of the information about the shielding objects. Details of the processing here will be described later.

S303

In S303, the base station control unit 150 calculates a movement destination position of each of the movable base stations 200, which corresponds to one of the clusters. Details of the calculation method will be described later.

S304

In S304, the base station control unit 150 moves the movable base station 200 to the position selected in S303. Specifically, for example, the base station control unit 150 transmits, to the movable base station 200, information about the position at which the movable base station 200 is to be arranged and a command for instructing the movable base station 200 to move to the position. The base station control unit 150 may further transmit, to the movable base station 200, identification information of each terminal to be connected to the movable base station 200, and may instruct the movable base station 200 to transmit, to each terminal, a control signal for connection with the movable base station 200.

Method for Generating Terminal Clusters

A method for generating terminal clusters in S302 will be described in detail. The base station control calculation unit 140 forms a cluster from terminals having a small distance between the terminals in consideration of the shielding objects. A specific processing procedure is as follows.

S1

In S1, the base station control calculation unit 140 sets each terminal as a separate terminal cluster (initial).

S2

In S2, the base station control calculation unit 140 obtains distances between all terminal clusters. The distance between terminal clusters may be an average value of the distances between sets of elements (terminals) in two terminal clusters, may be the smallest value among the distances between sets of elements (terminals) in two terminal clusters, may be the largest value among the distances between sets of elements (terminals) in two terminal clusters, or may be a statistical value other than these.

For example, in a case where there are terminals A1 and A2 in a terminal cluster A and there are terminals B1 and B2 in a terminal cluster B, the distances between sets of elements (terminals) in the two terminal clusters are the distance between the terminal A1 and the terminal B1, the distance between the terminal A1 and the terminal B2, the distance between the terminal A2 and the terminal B1, and the distance between the terminal A2 and the terminal B2.

An example of the distance between elements (terminals) in terminal clusters is as follows.

The distance between a terminal xn in one terminal cluster and a terminal xm in another terminal cluster is d(xn, xm).

If there is a shielding object between xn and xm, d(xn, xm)=(Euclidean distance between xn and xm)+a×b is defined. a is the attenuation amount (conversion distance of free space loss) per thickness [m] of the shielding object, and b is the thickness [m] of the shielding object.

If there is no shielding object between xn and xm, d(xn, xm)=(Euclidean distance between xn and xm) is defined.

S3

The base station control calculation unit 140 combines a combination of terminal clusters having the smallest distance between terminal clusters to form a new terminal cluster.

S4

The base station control calculation unit 140 repeats S2 and S3 until the desired number of terminal clusters is obtained. The desired number of terminal clusters is the number of movable base stations 200. However, the desired number of terminal clusters is not limited thereto.

Next, an example of a method for calculating the position of each of the movable base stations 200, which corresponds to one of the terminal clusters, in the above-described S303 will be described.

Example of Method for Calculating Position of Each of Movable Base Stations 200

The base station control calculation unit 140 installs each of the movable base stations 200 at the center of gravity of a terminal cluster by taking into account the material and shape of a shielding object. When the center of gravity is calculated, outliers (outlier terminals) are defined, and the center of gravity is obtained by excluding the outlier terminals.

Specifically, the position of the movable base station 200 is calculated by the following procedure. The following procedure is executed for each terminal cluster.

S1

In S1, the base station control calculation unit 140 obtains a center of gravity G of the terminal cluster. In S1, the weights of the elements (terminals) of the terminal cluster are all 1.

Here, when the center of gravity G is calculated, the center of gravity G is calculated by excluding outliers (outlier terminals). For example, the center of gravity G is temporarily obtained without excluding the outlier terminals, the distance between the center of gravity G and each terminal in the cluster is obtained, and one or more terminals in which the distance is equal to or larger than a threshold (or equal to or smaller than a threshold) are set as outlier terminals. The center of gravity G is then calculated from the terminal cluster from which the outlier terminals are excluded. The threshold may be determined by using, for example, an interquartile range, may be determined by using Smirnov-Grubbs test, or may be determined by another method.

In addition, it is assumed that the velocity and acceleration of each terminal are also collected and stored in the space information DB 400, and the base station control calculation unit 140 can acquire the velocity and acceleration of each terminal from the space information DB 400. In this case, the base station control calculation unit 140 may define a terminal having a velocity or acceleration equal to or higher than a threshold as an outlier terminal, and obtain the center of gravity G by excluding the outlier terminals from the terminal cluster.

The terminal cluster in the following processing excludes the outlier terminals.

S2

In S2, in a case where there is a shielding object between the center of gravity G of the terminal cluster and an element of the terminal cluster, the base station control calculation unit 140 sets the weight of the element as d×b. Here, d is a weight for the attenuation amount per thickness [m] of the shielding object, and b is the thickness [m] of the shielding object.

S3

In S3, the base station control calculation unit 140 calculates a center of gravity G' of the terminal cluster again and determines to arrange the movable base station 200 at G'.

For example, the coordinates of the center of gravity G' are $(x_G, y_G)$, the position of a terminal UEi without weight is $(x_i, y_i)$, and the number of terminals in the corresponding cluster is n. For example, in a case where there is a shielding object between the position $(x_3, y_3)$ of a terminal UE3 and the center of gravity G calculated in S1, $G'(x_G, y_G)$ can be calculated by the following formula.

$$G'(x_G, y_G) = \big((x_1 + x_2 + dbx_3 + \ldots + x_n)/(1 + 1 + db + \ldots + 1),\ (y_1 + y_2 + dby_3 + \ldots + y_n)/(1 + 1 + db + \ldots + 1)\big)$$

Note that the method of calculating the weight and the method of adding the weight to the center of gravity are not limited to the above methods, and other methods may be used.

According to the above technique, in a case where there is an unevenness in the distribution of the positions and velocities (accelerations) of terminals, eliminating this unevenness makes it possible to suppress the movement range of a base station.

Hardware Configuration Example

The control server 100 according to the present embodiment can be implemented, for example, by causing a computer to execute a program in which processing contents described in the present embodiment are described. Note that the "computer" may be a physical machine or a virtual machine on a cloud. In a case where a virtual machine is used, "hardware" described herein is virtual hardware.

The program can be stored and distributed by being recorded in a computer-readable recording medium (portable memory or the like). The program can also be provided through a network such as the Internet or an electronic mail.

Figure 11:
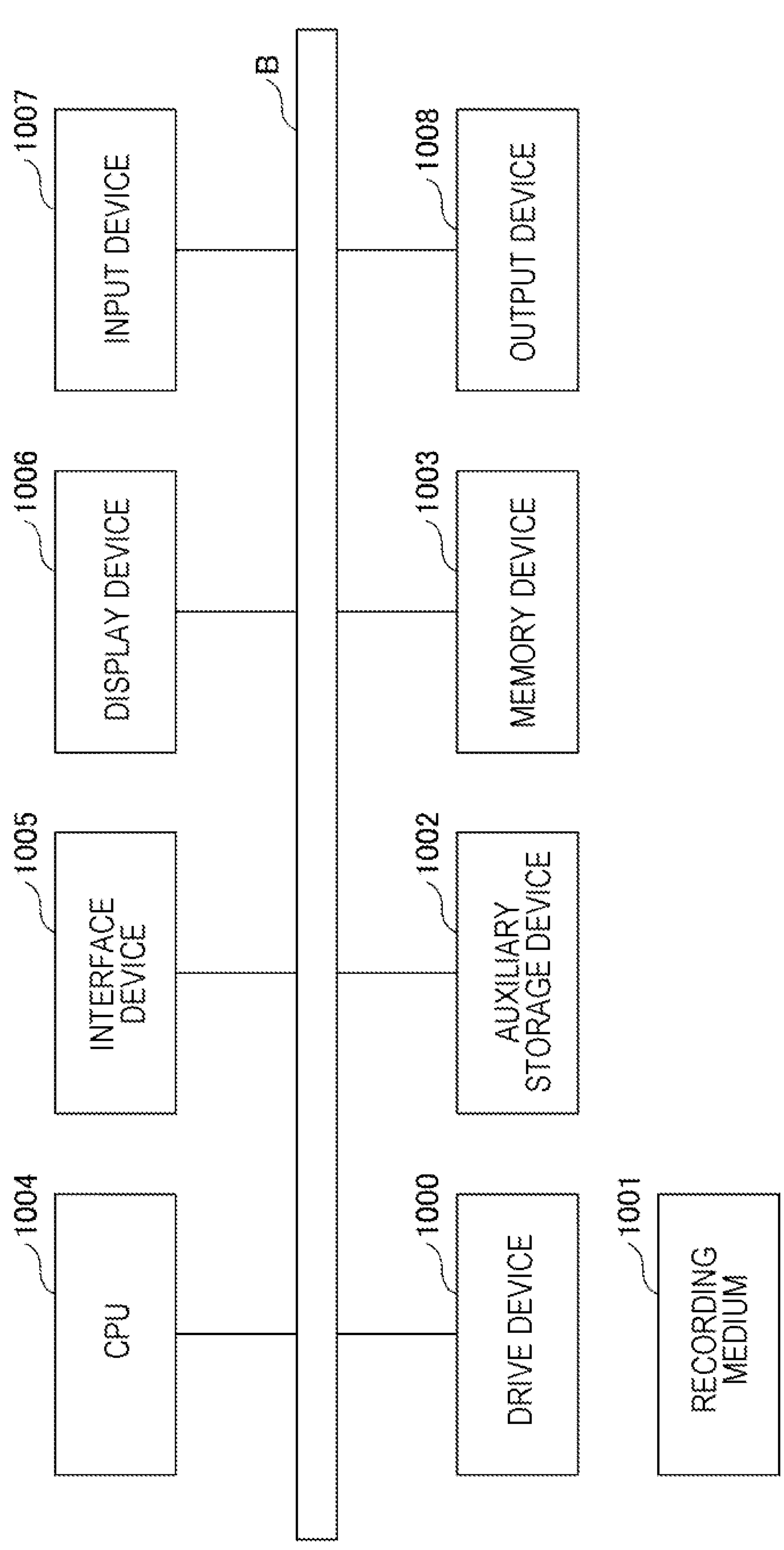
FIG. 11 is a diagram illustrating a hardware configuration example of a device.

FIG. 11 is a diagram illustrating a hardware configuration example of the computer. The computer in FIG. 11 includes a drive device 1000, an auxiliary storage device 1002, a memory device 1003, a CPU 1004, an interface device 1005, a display device 1006, an input device 1007, an output device 1008, and the like, which are connected to each other by a bus B.

The program for implementing the processing in the computer is provided by, for example, a recording medium 1001 such as a CD-ROM or a memory card. When the recording medium 1001 storing the program is set in the drive device 1000, the program is installed from the recording medium 1001 to the auxiliary storage device 1002 via the drive device 1000. However, the program is not necessarily installed from the recording medium 1001, and may be downloaded from another computer via a network. The auxiliary storage device 1002 stores the installed program, and also stores necessary files, data, and the like.

In a case where an instruction to start the program is issued, the memory device 1003 reads the program from the auxiliary storage device 1002, and stores the program therein. The CPU 1004 implements a function related to the control server 100 in accordance with the program stored in the memory device 1003. The interface device 1005 is used as an interface for connecting to a network. The display device 1006 displays a graphical user interface (GUI) or the like according to the program. The input device 1007 includes a keyboard and a mouse, buttons, a touch panel, or the like, and is used to input various operation instructions. The output device 1008 outputs a calculation result.

Effects of Embodiment

The technique according to the present embodiment makes it possible to control the communication quality and the movement range of a movable base station. More specifically, the moving time of the movable base station can be reduced, and the occurrence of a period in which the communication quality deteriorates can be suppressed. Furthermore, in a case where there is an unevenness in the distribution of the positions and velocities (accelerations) of terminals, excluding this unevenness makes it possible to suppress the movement range of the movable base station.

Summary of Embodiment

The present specification discloses at least a communication system, a control server apparatus, a control method, and a program described in the following clauses.

Clause 1

A communication system comprising a control server apparatus and a movable base station device, wherein the control server apparatus is configured to select, as a movement destination position of the movable base station device, a position at which a movement distance from a current position of the movable base station device is minimum, among positions at which a base station position evaluation index is equal to or larger than a threshold, or a position at which the base station position evaluation index is maximum, among positions at which the movement distance from the current position of the movable base station device is equal to or smaller than a threshold, and wherein the control server apparatus is configured to perform control to move the movable base station device to the movement destination position.

Clause 2

The communication system according to clause 1, wherein the base station position evaluation index is a number of line-of-sight terminals, a number of elements in a line-of-sight area, communication quality of an area element, or communication quality of a terminal.

Clause 3

A communication system including a control server apparatus and a movable base station device, wherein the control server apparatus is configured to generate a terminal cluster in which terminal devices are clustered based on a position of each terminal device, wherein the control server apparatus is configured to determine an outlier terminal device based on the position of each terminal device, a velocity of each terminal device, or an acceleration of each terminal device, and calculate a movement destination position of the movable base station device based on a position of a center of gravity of the terminal cluster after the outlier terminal device is excluded from the terminal cluster, and wherein the control server apparatus is configured to perform control to move the movable base station device to the movement destination position.

Clause 4

A control server apparatus in a communication system including the control server apparatus and a movable base station device, the control server apparatus including:

a base station control calculation unit configured to select, as a movement destination position of the movable base station device, a position at which a movement distance from a current position of the movable base station device is minimum, among positions at which a base station position evaluation index is equal to or larger than a threshold, or a position at which the base station position evaluation index is maximum, among positions at which the movement distance from the current position of the movable base station device is equal to or smaller than a threshold; and a base station control unit configured to perform control to move the movable base station device to the movement destination position.

Clause 5

A control server apparatus in a communication system including the control server apparatus and a movable base station device, the control server apparatus including:

a base station control calculation unit configured to generate a terminal cluster in which terminal devices are clustered based on a position of each terminal device, determine an outlier terminal device based on the position of each terminal device, a velocity of each terminal device, or an acceleration of each terminal device, and calculate a movement destination position of the movable base station device based on a position of a center of gravity of the terminal cluster after the outlier terminal device is excluded from the terminal cluster; and a base station control unit configured to perform control to move the movable base station device to the movement destination position.

Clause 6

A control method in a communication system including a control server apparatus and a movable base station device, the control method including:

a step in which the control server apparatus selects, as a movement destination position of the movable base station device, a position at which a movement distance from a current position of the movable base station device is minimum, among positions at which a base station position evaluation index is equal to or larger than a threshold, or a position at which the base station position evaluation index is maximum, among positions at which the movement distance from the current position of the movable base station device is equal to or smaller than a threshold; and a step in which the control server apparatus performs control to move the movable base station device to the movement destination position.

Clause 7

A control method in a communication system including a control server apparatus and a movable base station device, the control method including:

a step in which the control server apparatus generates a terminal cluster in which terminal devices are clustered based on a position of each terminal device;

a step in which the control server apparatus determines an outlier terminal device based on the position of each terminal device, a velocity of each terminal device, or an acceleration of each terminal device, and calculates a movement destination position of the movable base station device based on a position of a center of gravity of the terminal cluster after the outlier terminal device is excluded from the terminal cluster; and a step in which the control server apparatus performs control to move the movable base station device to the movement destination position.

Clause 8

A program for causing a computer to function as each unit in the control server apparatus according to clause 4 or 5.

Although the present embodiment has been described above, the present invention is not limited to such a specific embodiment, and various modifications and changes can be made within the scope of the gist of the present invention described in the claims.

REFERENCE SIGNS LIST

100 Control server
200 Movable base station
300 Terminal
400 Space information DB
110 Information communication I/F unit
120 Shielding object information acquisition unit
130 Terminal information acquisition unit
140 Base station control calculation unit
150 Base station control unit
160 Control communication I/F unit
210 Control communication I/F unit
220 Movable control unit
230 Terminal connection control unit
240 Wireless transmission/reception unit
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system comprising:

a memory; and a processor coupled to the memory and configured to work as a control server apparatus and a movable base station device, wherein the processor is configured, as the control server apparatus, to:

select, as a movement destination position of the movable base station device, a position at which a movement distance from a current position of the movable base station device is minimum, among positions at which a base station position evaluation index is equal to or larger than a threshold; and perform control to move the movable base station device to the movement destination position.

2. The communication system according to claim 1, wherein the base station position evaluation index is a number of line-of-sight terminals, a number of elements in a line-of-sight area, communication quality of an area element, or communication quality of a terminal.

3. The communication system according to claim 1, wherein the processor is further configured, as the control server apparatus, to:

generate a terminal cluster in which terminal devices are clustered based on a position of each terminal device;

determine an outlier terminal device based on the position of each terminal device, a velocity of each terminal device, or an acceleration of each terminal device;

calculate a movement destination position of the movable base station device based on a position of a center of gravity of the terminal cluster after the outlier terminal device is excluded from the terminal cluster; and perform control to move the movable base station device to the movement destination position.

4. A non-transitory computer-readable recording medium storing a program for causing a computer to work as the communication system according to claim 1.

5. The communication system according to claim 1, further comprising a storage, wherein the storage stores space information database including information of a shielding object in an area in which the movable base station is located; and wherein the processor is further configured, as the control server apparatus, to:

acquire the information of the shielding object from the space information database; and select the movement destination position of the movable base station device based on the information of the shielding object.

6. A computer-implemented method for controlling a communication system including a control server apparatus and a movable base station device, wherein the method controls the control server apparatus to:

select, as a movement destination position of the movable base station device;

a position at which a movement distance from a current position of the movable base station device is minimum, among positions at which a base station position evaluation index is equal to or larger than a threshold; and perform control to move the movable base station device to the movement destination position.

7. The method according to claim 6, wherein the method further controls the control server apparatus to:

generate a terminal cluster in which terminal devices are clustered based on a position of each terminal device;

determine an outlier terminal device based on the position of each terminal device, a velocity of each terminal device, or an acceleration of each terminal device;

calculate a movement destination position of the movable base station device based on a position of a center of gravity of the terminal cluster after the outlier terminal device is excluded from the terminal cluster; and perform control to move the movable base station device to the movement destination position.

* * * * *